United States Patent
Koscielski et al.

(10) Patent No.: US 11,305,948 B2
(45) Date of Patent: Apr. 19, 2022

(54) MAGNETIC WORKPIECE CONVEYOR FOR ROBOTIC WELDING CELL

(71) Applicant: Doben Limited, Windsor (CA)

(72) Inventors: Larry Koscielski, LaSalle (CA); Raamprakash Soundaran, Windsor (CA)

(73) Assignee: Doben Limited, Windsor (CA)

( * ) Notice: Subject to any disclaimer, the term of this patent is extended or adjusted under 35 U.S.C. 154(b) by 0 days.

(21) Appl. No.: 17/058,387

(22) PCT Filed: Jun. 6, 2018

(86) PCT No.: PCT/CA2018/050678
§ 371 (c)(1),
(2) Date: Nov. 24, 2020

(87) PCT Pub. No.: WO2019/232608
PCT Pub. Date: Dec. 12, 2019

(65) Prior Publication Data
US 2021/0198051 A1     Jul. 1, 2021

(51) Int. Cl.
*B65G 47/24*     (2006.01)
*B23Q 7/18*      (2006.01)
*B65G 54/02*     (2006.01)

(52) U.S. Cl.
CPC .............. *B65G 47/24* (2013.01); *B23Q 7/18* (2013.01); *B65G 54/02* (2013.01)

(58) Field of Classification Search
CPC . B23K 37/04; B23Q 7/18; B23Q 7/16; B65G 47/24; B65G 54/02
(Continued)

(56) References Cited

U.S. PATENT DOCUMENTS

| | | | |
|---|---|---|---|
| 1,343,648 A | 6/1920 | Smith | |
| 2,708,022 A | 5/1955 | Pettigrew | |

(Continued)

FOREIGN PATENT DOCUMENTS

| | | |
|---|---|---|
| CH | 446190 A | 10/1967 |
| CN | 101941588 A | 1/2011 |

(Continued)

OTHER PUBLICATIONS

International Search Report and Written Opinion for International Application No. PCT/CA2018/050678 dated Feb. 20, 2019.

(Continued)

*Primary Examiner* — James R Bidwell
(74) *Attorney, Agent, or Firm* — Carlson, Gaskey & Olds, P.C.

(57) ABSTRACT

A conveyor for ferrous workpieces includes a frame. A static bed is affixed to the frame. The static bed has a workpiece support portion constructed from a non-magnetic material. The workpiece support portion defines a workpiece flow path. A drive assembly is arranged beneath the workpiece support portion. The drive includes multiple discrete magnets configured to move in a direction of the workpiece flow path. At least one guide rail extends upward with respect to the workpiece support portion on a side opposite the drive assembly. The guide rail is configured to orient a workpiece to a desired position with respect to the workpiece flow path.

20 Claims, 7 Drawing Sheets

(58) Field of Classification Search
USPC .................................................. 198/619, 805
See application file for complete search history.

(56) References Cited

U.S. PATENT DOCUMENTS

| | | | |
|---|---|---|---|
| 2,722,406 A | 11/1955 | Kurek | |
| 3,476,232 A | 11/1969 | Merwin et al. | |
| 3,497,056 A | 2/1970 | Clark | |
| 3,675,757 A | 7/1972 | Yabuta | |
| 4,067,438 A | 1/1978 | Spurr et al. | |
| 4,197,935 A | 4/1980 | Aterianus et al. | |
| 4,805,761 A * | 2/1989 | Totsch | B65G 54/02 |
| | | | 104/156 |
| 5,170,714 A * | 12/1992 | Katagiri | B29C 51/261 |
| | | | 104/282 |
| 5,423,410 A | 6/1995 | Keller et al. | |
| 5,871,084 A | 2/1999 | Kasik | |
| 6,311,832 B1 | 11/2001 | Kwasniewicz et al. | |
| 6,571,934 B1 | 6/2003 | Thompson et al. | |
| 6,629,690 B1 | 10/2003 | Viens | |
| 7,588,139 B1 | 9/2009 | Campbell, III | |
| 7,597,186 B2 * | 10/2009 | Chung | G03G 15/6529 |
| | | | 198/619 |
| 8,261,905 B2 * | 9/2012 | Kholodenko | H01L 21/67706 |
| | | | 198/619 |
| 8,308,419 B2 | 11/2012 | Nihei et al. | |
| 8,776,994 B2 | 7/2014 | Ozaki | |
| 9,246,377 B2 * | 1/2016 | Fukasawa | H01L 21/677 |
| 9,776,811 B2 | 10/2017 | Itoh | |
| 10,421,626 B2 * | 9/2019 | Gu | B65G 54/02 |
| 10,732,192 B2 * | 8/2020 | Chida | B25J 15/0038 |
| 2004/0226117 A1 | 11/2004 | Burgess | |
| 2007/0215439 A1 | 9/2007 | Kauppila et al. | |
| 2012/0055762 A1 | 3/2012 | Kobayashi et al. | |
| 2013/0126307 A1 * | 5/2013 | Stoeckle | B65G 21/2018 |
| | | | 198/619 |
| 2016/0272432 A1 | 9/2016 | Colin | |

FOREIGN PATENT DOCUMENTS

| | | |
|---|---|---|
| CN | 102229386 A | 11/2011 |
| CN | 105712049 A | 6/2016 |
| CN | 205526196 U | 8/2016 |
| CN | 106892250 A | 6/2017 |
| CN | 107758304 A | 3/2018 |
| DE | 4210188 A1 | 10/1993 |
| GB | 2113193 A | 8/1983 |
| JP | S5693087 A | 7/1981 |
| JP | H07187356 A | 7/1995 |
| JP | 2012224460 A | 11/2012 |
| JP | 2017105580 A | 6/2017 |
| WO | 2016000076 A1 | 1/2016 |

OTHER PUBLICATIONS

Chinese Office Action for Chinese Application No. 201880094329.5 dated Sep. 3, 2021.
Supplementary European Search Report for European Application No. 18921560.1 dated Dec. 15, 2021.

* cited by examiner

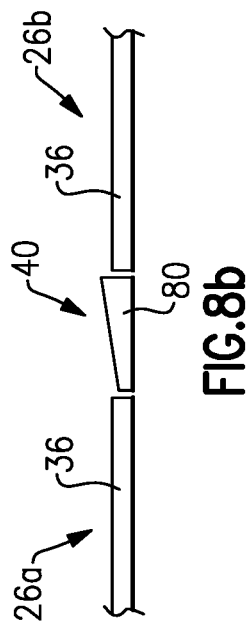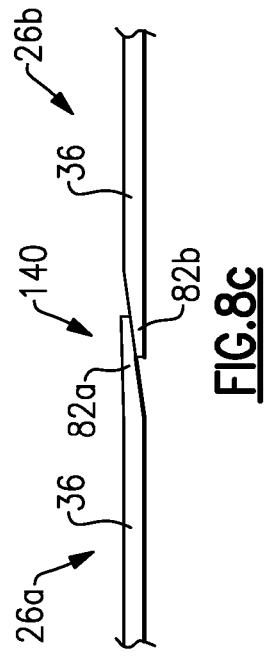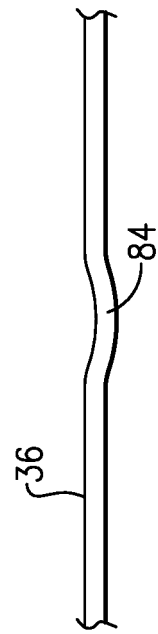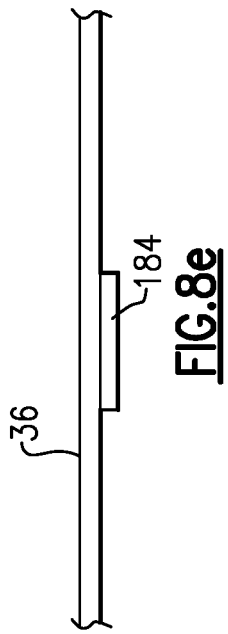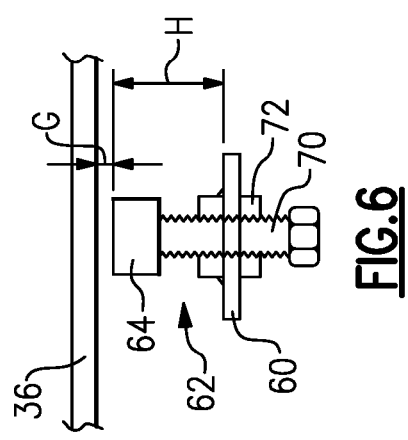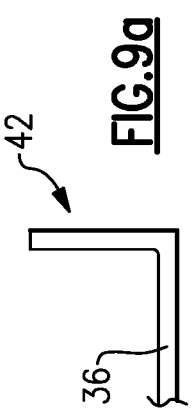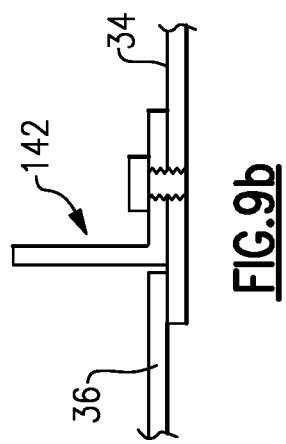

MAGNETIC WORKPIECE CONVEYOR FOR ROBOTIC WELDING CELL

BACKGROUND

The disclosure relates to a conveyor used to move parts or workpieces in a production environment, such as weldments for a welding operation.

Welding is a very common production operation used to weld steel components together or attach weld studs or nuts. These operations are often contained within gated work areas for safety. To further enhance safety and to speed production, a robot may be used to pick workpieces from a conveyor and to the work area where the workpiece is loaded into a fixture for welding.

A robot requires the workpieces to be located relatively precisely on the conveyor in order to quickly pick up the workpieces and repeatedly locate the workpieces in the fixture. A conveyor may incorporate some sort of locating feature that cooperates with each workpiece in an attempt to more accurately locate the workpieces for the robot. One type of conveyor uses a continuous chain drive that has exposed pins extending above a workpiece support surface to engage a hole in the workpiece.

Some conveyor systems that have complicated locating features may require lengthy set up times. Pin-type conveyors require the operator to load the workpiece relatively precisely on the pin as the chain drive is rotating. Some workpieces lack holes that can be used by pins, or may have only one hole, which may also need to be used by the robot when picking up the workpiece.

SUMMARY

In one exemplary embodiment, a conveyor for ferrous workpieces includes a frame. A static bed is affixed to the frame. The static bed has a workpiece support portion constructed from a non-magnetic material. The workpiece support portion defines a workpiece flow path. A drive assembly is arranged beneath the workpiece support portion. The drive includes multiple discrete magnets configured to move in a direction of the workpiece flow path. At least one guide rail extends upward with respect to the workpiece support portion on a side opposite the drive assembly. The guide rail is configured to orient a workpiece to a desired position with respect to the workpiece flow path.

In a further embodiment of the above, the drive assembly includes a flight bar. At least one magnet is secured to the flight bar by an adjustment member that provides a magnet height relative to the flight bar. The magnet height corresponds to a desired gap between the magnet and the static bed.

In a further embodiment of any of the above, the drive assembly includes a pair of laterally spaced apart continuous chains. The flight bars are mounted to the chains.

In a further embodiment of any of the above, the adjustment member includes a screw and a jam nut.

In a further embodiment of any of the above, the static bed includes a substrate that has a coating that provides a friction modifier in relation to the substrate.

In a further embodiment of any of the above, the static bed includes reinforcements that are configured to provide a planar support surface for the workpieces.

In a further embodiment of any of the above, the static bed multiple workpiece support portions have upstream and downstream surfaces that provide the workpiece flow path. The upstream surface is raised with respect to the downstream surface.

In a further embodiment of any of the above, the upstream surface overlaps the downstream surface.

In a further embodiment of any of the above, the guide rail is integral with the static bed.

In a further embodiment of any of the above, the guide rail is discrete from the static bed and secured relative to the frame.

In a further embodiment of any of the above, the drive assembly includes a drive motor and a controller that is in communication with the drive motor and configured to selectively drag the workpiece to an unload position.

In a further embodiment of any of the above, an escapement is mounted to the frame. The workpiece is configured to abut the escapement in the unload position.

In another exemplary embodiment, a method of conveying workpieces comprising the steps of loading a workpiece onto a static bed to provide a workpiece flow path. The workpiece is dragged magnetically along the workpiece flow path. The workpiece is oriented with a guide rail during the magnetically dragging step.

In a further embodiment of any of the above, the static bed includes multiple workpiece support portions that have upstream and downstream surfaces that provide the workpiece flow path. The upstream surface is raised with respect to the downstream surface such that the workpiece drops during the magnetically dragging step.

In a further embodiment of any of the above, a drive assembly includes multiple discrete magnets arranged beneath the static bed. The magnetically dragging step includes moving the magnets in a direction of the workpiece flow path.

In a further embodiment of any of the above, the magnets are spaced from the static bed a desired gap to produce a desired magnetic coupling between the magnets and the workpiece.

In a further embodiment of any of the above, the magnetically dragging step is based upon a robot unload sequence.

In a further embodiment of any of the above, the magnetically dragging step is stopped once the workpiece reaches an unload position and awaits the robot to unload the workpiece from the unload position with a drive assembly paused.

In a further embodiment of any of the above, the magnetically dragging step includes sliding a first workpiece surface along the static bed. The workpiece orienting step includes sliding a second workpiece surface along the guide rail to position the workpiece into a desired unloading orientation.

BRIEF DESCRIPTION OF THE DRAWINGS

The disclosure can be further understood by reference to the following detailed description when considered in connection with the accompanying drawings wherein:

FIG. 6 is an enlarged schematic view of a magnet and an adjustment member of the drive assembly.

FIGS. 8b and 8c are cross-sectional views of example transitions.

FIGS. 8d and 8e are cross-sectional views of the static bed with example reinforcements.

FIGS. 9a and 9b illustrate example guides.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible. Like reference numbers and designations in the various drawings indicate like elements.

DETAILED DESCRIPTION

Figure 1:
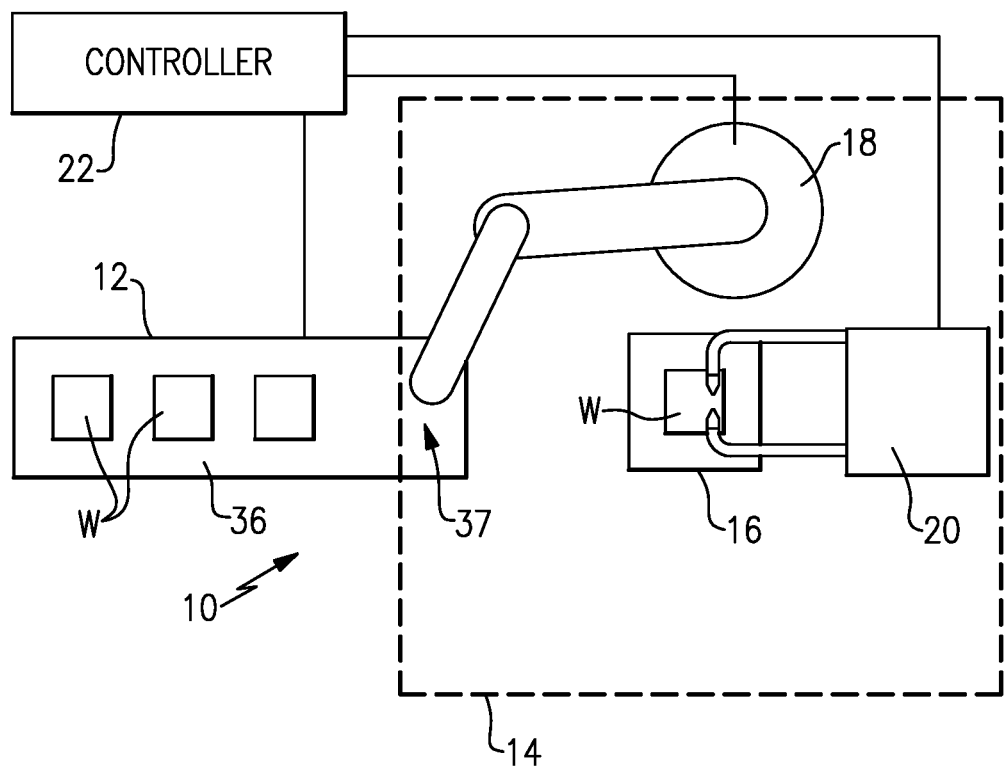
FIG. 1 is a schematic view of a welding cell.

A welding cell 10 is illustrated in FIG. 1. The cell 10 includes a conveyor 12 that feeds workpieces W along a static bed 36 along a workpiece flow path to a work area, which includes a robot 18 and a weld gun 20, for example. A robot 18 picks up the workpiece W from an unloading position 37 on the conveyor 12 and carries it to a fixture 16 where the weld gun 20 performs various welding operations. A controller 22 (FIG. 1) may be connected to the conveyor 12, robot 18 and weld gun 20 to coordinate their operation for efficiency.

The disclosed conveyor 12 uses discrete magnets (64 in FIG. 5) to pull workpieces W along a surface or workpiece support portion of a static bed 36 in such a fashion as to manipulate the workpieces W from a crude load position to a predictable unload position.

Figure 2:
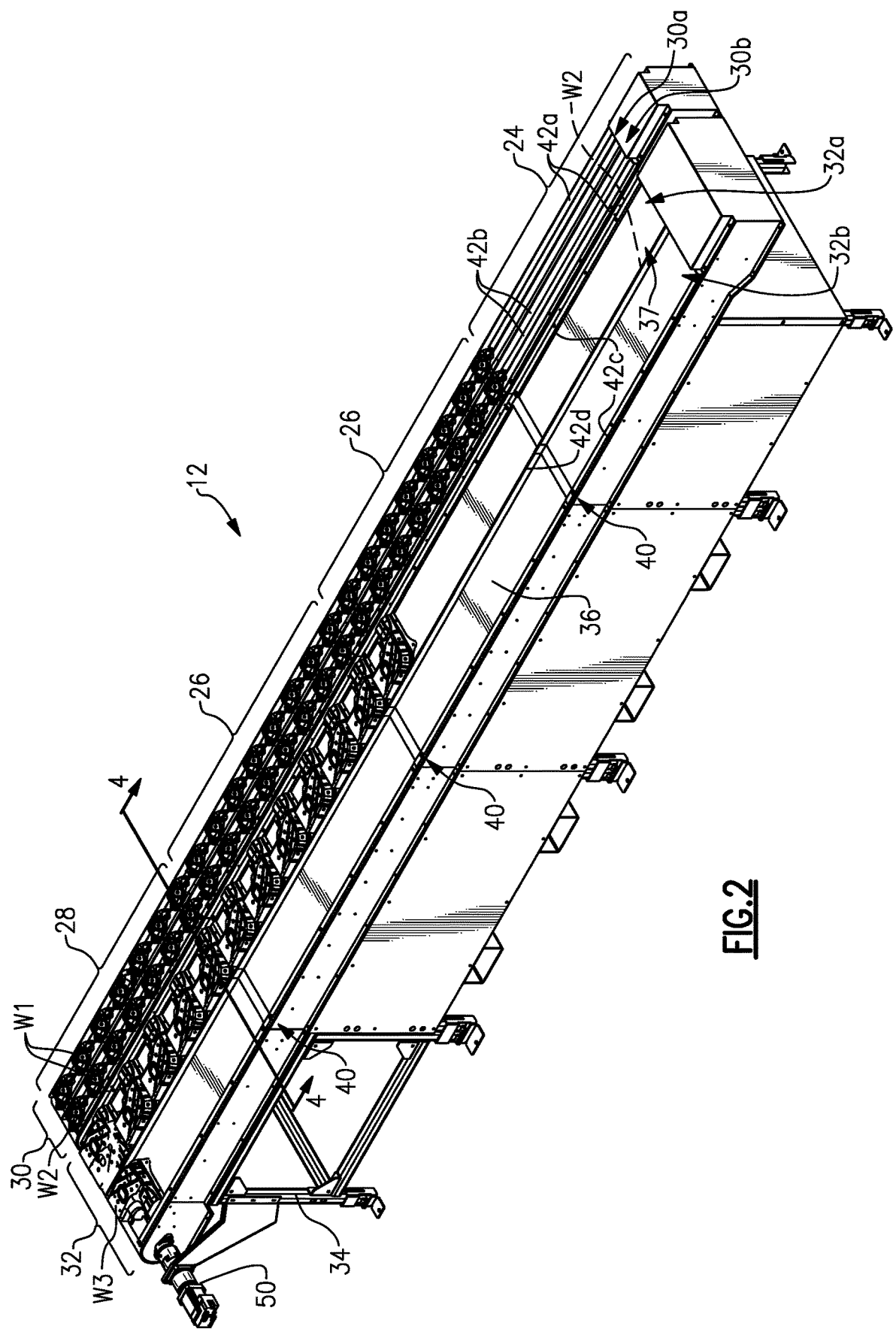
FIG. 2 is a perspective view of a conveyor for use with the welding cell shown in FIG. 1.

Referring to FIG. 2, the conveyor 12 includes various modules that may be interconnected with one another to provide a desired conveyor length and configuration. In the example, the conveyor 12 includes a head module 24, a desired number of intermediate modules 26 and a tail module 28. Transitions 40 are provided between the adjacent modules 24, 26, 28. The static bed 36 is supported by a frame 34 such that the static bed 36 is affixed to and does not move relative to the frame 34. The static bed 36 is a non-magnetic material such that the workpieces W, which are ferrous, may be magnetically dragged across the static bed 36 more easily.

The head module 24 is typically where a worker loads the workpieces W1-W3 (simply referred to as "workpieces W") onto the conveyor 12, and the tail module 28 is arranged near the work area and provides the unloading position 37 from which the robot 18 picks up the workpiece W.

An escapement may be provided, for example, at the unloading position of the tail module 28. During conveyor operation, the conveyor 12 may be selectively operated by the controller 22 to drag the workpieces W up to and/or in abutment with an edge provided by the escapement.

While FIG. 2 shows a common conveyor configuration, the conveyor 12 does not have to be straight or in one plane. The workpiece flow path can, for example, be U-shaped, right angled, serpentine, or circular. The static bed 36 can be parallel to the ground, tipped so one edge of the conveyor is higher than the other, or configured to gain or lose elevation between the load and unload ends. These configuration options may be employed for convenience, to achieve a specific conveyor geometry, or to more effectively exploit gravity to assist in achieving and maintaining the desired workpiece orientation.

Figure 4:
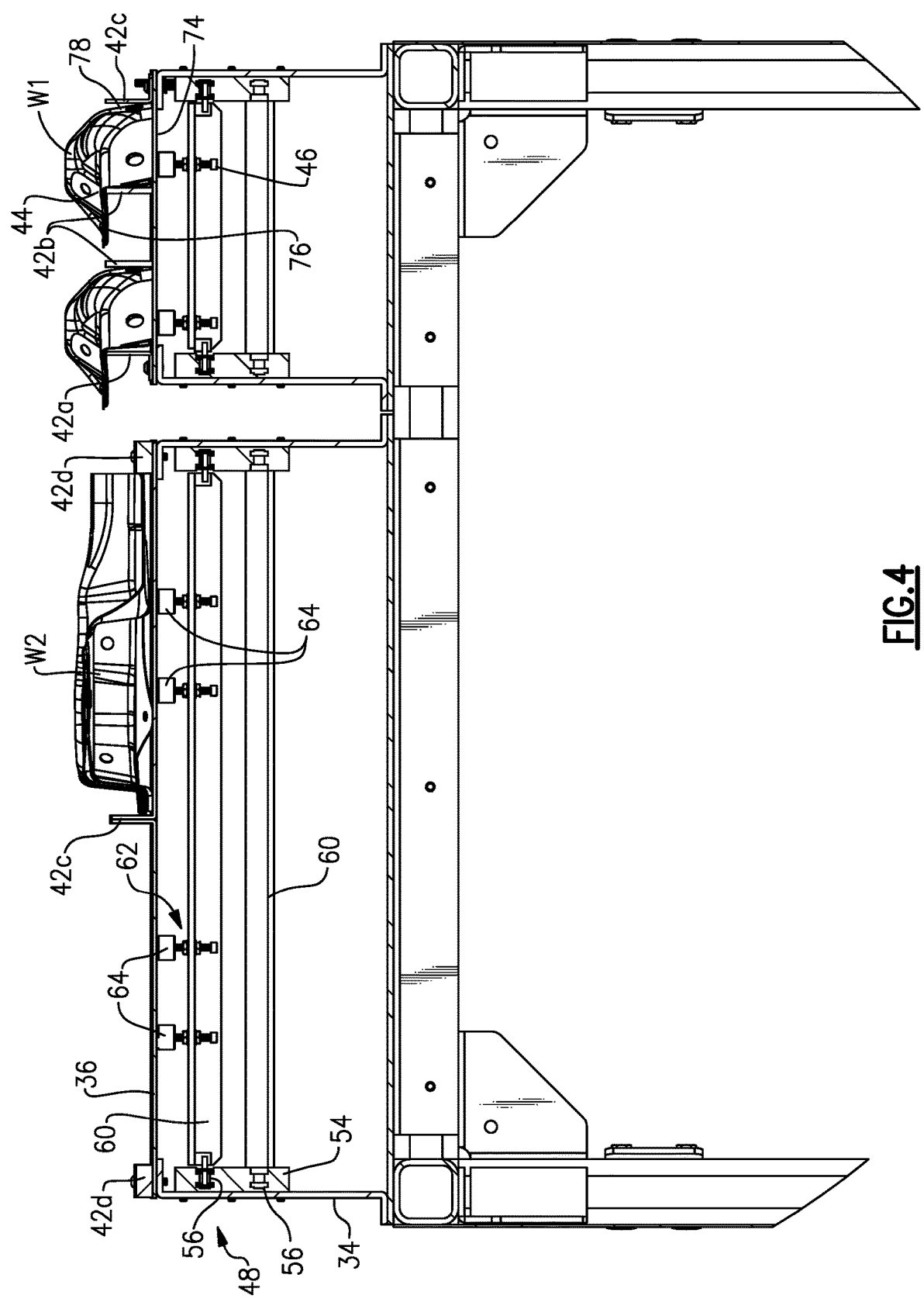
FIG. 4 is a cross-sectional view of the conveyor shown in FIG. 2 taken along line 4-4.

In the example shown, the conveyor 12 provides conveyor sections 30, 32, wherein each conveyor section provides lanes 30a, 30b and 32a, 32b that carry multiple parts. Barriers are provided in the example by longitudinal guides 42a-42d (collectively referred to as "guides 42"). Referring to FIG. 4, each guide 42 provides an upper face 44 and side faces 46 so that various surfaces 74, 76, 78 of the workpieces W1-W3 are engaged as the workpieces W1-W3 are dragged along the static bed 36 to orient the workpieces. The guides 42 assist in maintaining desired orientation of the workpieces such that there is positional consistency when dragged across the static bed 36 to provide desired orientation of the workpiece at the unloading position 37.

The conveyor 12 can be configured with any number of sections and lanes. The principle limitation is the workpiece size which governs the operator's ability to reach the empty workpiece loading stations. In the example shown in FIGS. 2-4, the conveyor 12 is configured with four lanes. Two wide lanes for the right and left hand versions of a larger workpiece W2, W3 and two smaller lanes to carry the same workpiece W1. The conveyor design can accommodate the number, size and configuration of lanes most suitable for the production process. The lanes are defined by the guides, which contain and guide the workpieces W down the length of the conveyor 12.

Figure 5:
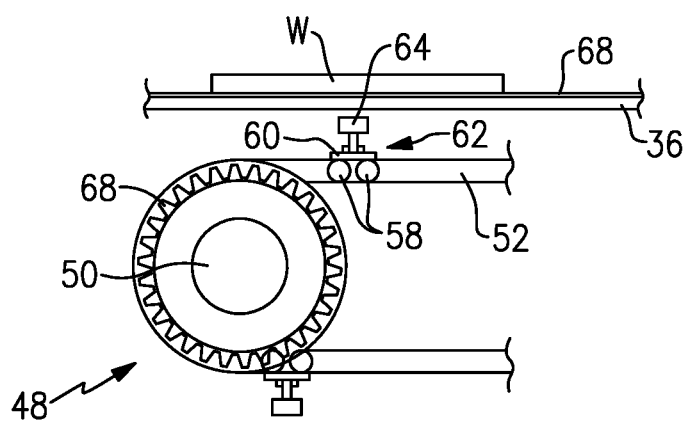
FIG. 5 is a partial cross-sectional view of the conveyor and a drive assembly.
Figure 3:
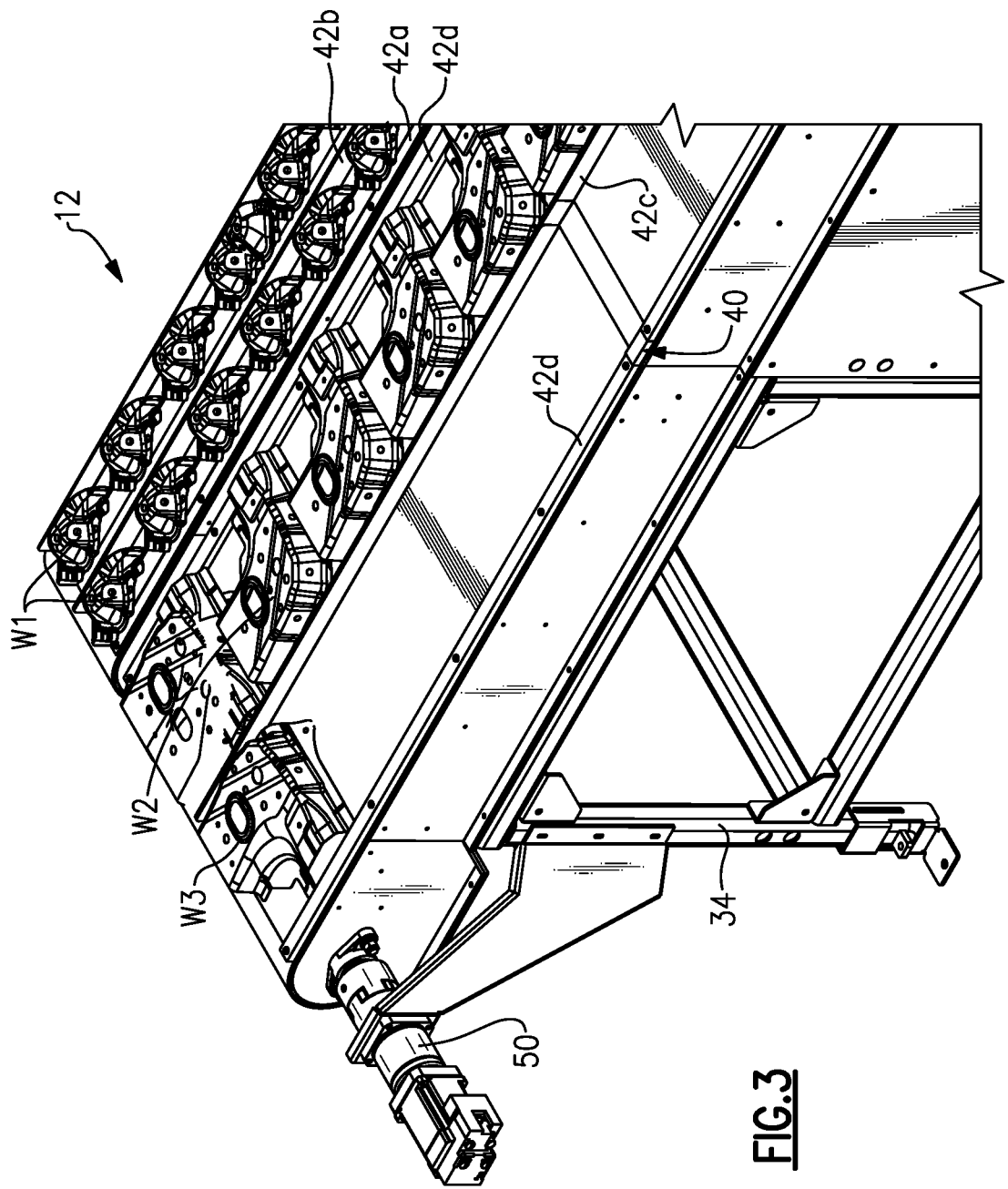
FIG. 3 is an enlarged view of a tail portion of the conveyor shown in FIG. 3.

Referring to FIGS. 3-5, a drive assembly 48 includes a drive motor 50 that rotationally drives a pair of continuous chains 52 mounted to sprockets 66. The drive motor 50 is a servoelectric motor in one embodiment because it provides for accurate control of position, velocity, acceleration, and torque. Other electric, air, or hydraulic motors and speed reducers could instead be employed depending on the operating environment, customer equipment standards, and desired or required level of control. The drive assembly 48 is not sealed from the environment.

The chain 52 includes rollers 58 received in vertically spaced apart slots 56 in a polymer guide track 54, as best shown in FIG. 4. Multiple flight bars 60 are interconnected between the laterally spaced apart chains 52. Discrete magnets 64 are mounted to the flight bar 60 by an adjustment member such as a jack screw assembly 62 beneath the static bed 36. Moreover, the flight bar 60 may include a series of laterally spaced apart holes that enable the lateral position of the magnet 64 to be adjusted during set up of the conveyor 12.

The magnets 64 are conducive to imparting a magnetic flux on the workpiece sufficient to overcome friction and drag the workpiece W. The guide track 54 ensures the flight bars 60 are supported during the entire path of travel to ensure the magnets 64 remains consistently spaced from the workpiece W. Other forms of belt or linkage conveyors may be employed.

The conveyor 12 utilizes discrete permanent magnets 64, singly or in a grouping, to pull ferrous workpieces W along a nonmagnetic static bed from an operator loading position to an unloading position. The position and spacing of magnets 64 are adjustable to suit a particular workpiece or group of workpieces. The objective is to position the magnets 64 such that the magnetic field interacts with the workpieces W at locations which ensure the workpiece achieves a consistent orientation as it transits the length of the static bed 36.

As shown in FIG. 5, an upper surface of the static bed 36 may have a coating 68 that is used as a friction modifier to either reduce or increase friction between the workpiece and the static bed 36, as desired.

Referring to FIG. 6, the jack screw assembly 62 includes a screw 70 supporting the magnet 64 at one end. The height of the magnet 64 with respect to the flight bar 60 may be adjusted to achieve a desired height H, which provides a desired gap G with respect to the static bed 36. A jam nut 72 is used to lock the screw 70 to the flight bar 60 and maintain the height H. Adjusting the height of the magnet 64, and thus the gap G, may be used to increase or decrease the magnetic pull on the workpiece.

The strength of the magnetic pull may also be adjusted, for example, by changing the specification of the static bed thickness, or by a magnet holder made from a low friction polymer material that functions as a mechanical spacer and may be used to rub against the bottom of the static bed for supplemental support of the static bed.

The workpieces W illustrated are examples and do not reflect the range of size, configuration, or orientation of workpieces that may be conveyed. The magnets 64 may be round, square, rectangular, or any other shape in the plan view depending on the requirements for magnetic field size, strength, and geometry. If multiple magnets are used, they can have different sizes, strength, or geometry.

There needs to be enough magnetic attraction between the magnet 64 and workpiece W that the workpiece will follow the magnet 64 but, not so much as adjacent workpieces become attracted strongly to each other. If the workpiece coupled to the permanent magnet(s) 64 attracts an adjacent workpiece, it would essentially double the mass and friction the magnetic field coupling strength required to move the workpiece along with the driven flight bar 60. Such an increase in loading would almost certainly exceed the magnetic field coupling strength and cause the workpiece motion to stop until the next magnet re-establishes a magnetic field coupling and tries to move the workpiece again.

In operation, a workpiece will be advanced along the conveyor by the magnet field coupling until they contact other workpiece(s), crowding the workpieces together. The contacting workpieces in the crowded configuration will result in a static friction high enough to break the magnetic field coupling. At the point of contact, the magnetic flux will interact on both workpieces, thereby diminishing the magnetic field coupling between the moving workpiece and magnet 64.

Figure 7:
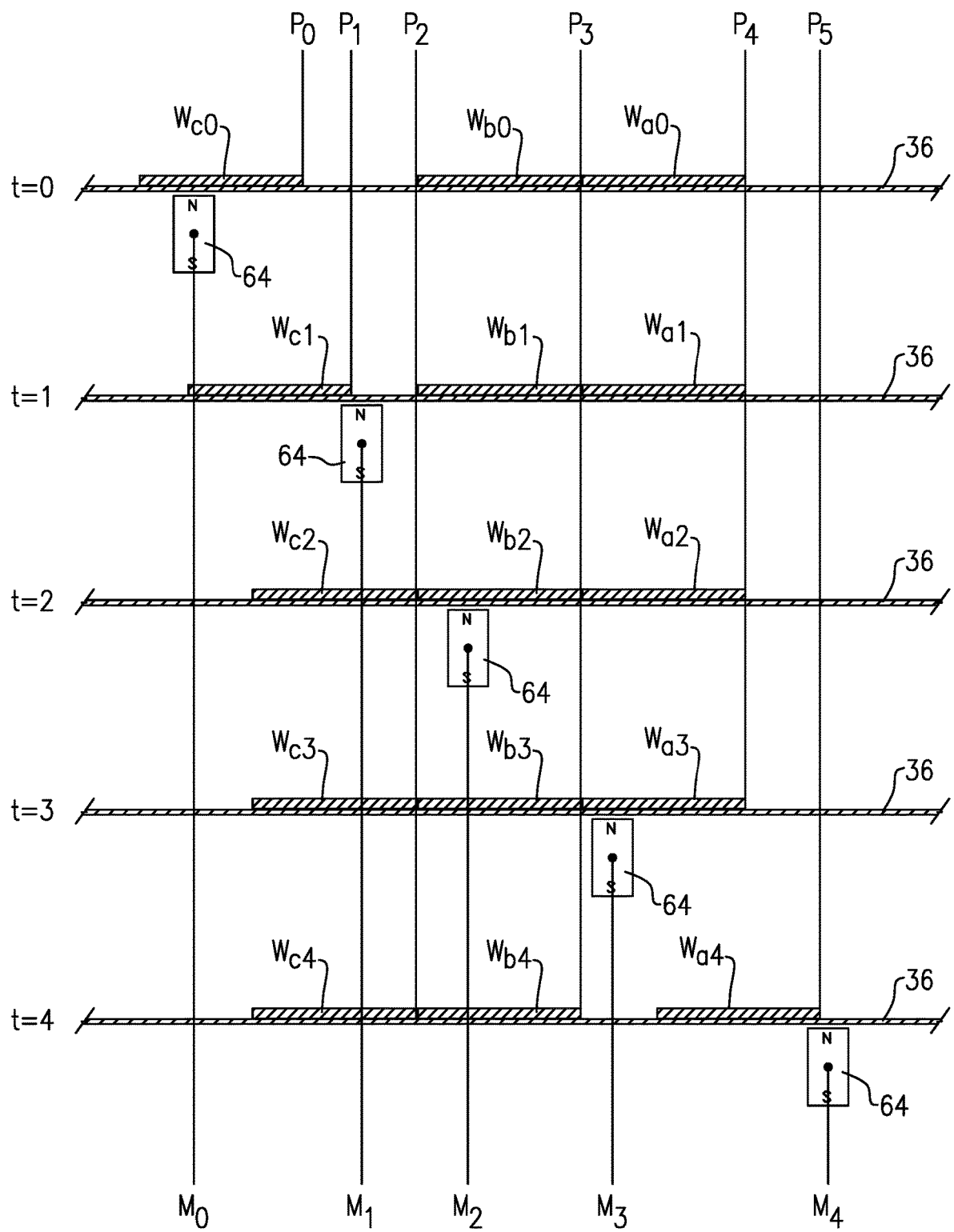
FIG. 7 is a view illustrating the positions of a magnet and three workpieces over time during conveyor operation.

FIG. 7 is illustrative of the operating concept. The magnetic conveyor 12 includes a static bed 36, upon which three workpieces Wa, Wb, Wc are resting at times t=0, t=1, t=2, t=3, and t=4. When the following text refers to a workpiece, the workpiece letter (a, b, c) is used. When the text refers to a workpiece at a specific time, the specific time will be appended as a subscripts, i.e., 0, 1, 2, 3, and 4. For example, Wa0 corresponds to workpiece Wa at time t=0.

To explain the operating concept, workpieces Wa, Wb, Wc are illustrated as simple plates in cross section. However, the concept applies to very complex shaped ferrous metal components such as sheet metal stampings used in automobile construction. At t=0, the leading edges of: workpiece Wc0 is at position P0; workpiece Wb0 is at position P3; and, workpiece Wa0 is at position P4. Similarly, the magnet 64 is arranged at a position M at various times. Thus, M0 is the position of the magnet 64 at t=0, and so on.

The permanent magnet 64 orientation with its north pole towards workpiece Wc0 is an example. In practice, there are multiple magnets spaced along the conveyor and moving beneath the static bed 36. The pole configuration and orientation of magnet 64 can be altered to affect the magnetic attraction of the magnet to the workpieces. At t=0, magnet 64 is at a position M0, which is beneath workpiece Wc0 such that the magnetic field projects through the non-magnetic static bed 36, and attracts workpiece Wc0. Since the sheet metal of workpiece Wc is relatively thin, when magnet 64 is at position M0 the workpiece will be completely saturated by the magnetic flux projecting from magnet 64. The magnetic attraction is a function of the workpiece thickness and the attraction force will be much lower than its maximum capability when workpiece Wc is completely saturated and unable to contain all of the magnetic flux.

The attractive force coupling magnet 64 to workpiece Wc urges workpiece Wc to follow magnet 64 as it translates from position P0 towards position P1. However, friction between workpiece Wc and the static bed 36 limits the ability of workpiece Wc to slide along the static bed 36. The friction between the workpiece Wc and static bed 36 is affected by such things as the mass of the workpiece, the strength of the magnet, contact surface area (including variations in flatness), contacting surface roughness, the presence of lubrication, the attitude of the sliding surface, and general cleanliness of the static bed. The value of static friction (i.e., stiction) will influence the preferred speed of magnet 64 motion. If the conveyor speed is too fast, there may not be enough interaction time to accelerate the workpiece Wc from its rest position. Whenever the friction is too high, the magnetic coupling will be sheared and workpiece Wc will not move when magnet 64 does.

FIG. 7 also includes an illustration of the state of magnetic conveyor 12 at time 1 (t=1). In this case, magnet 64 has moved from the previous position M0 to position M1. The workpiece Wc has moved from the previous position P0 and is now referenced as workpiece Wc1 at P1. The distance travelled by the workpiece Wc is much less than the travel of the magnet 64 because for much of the transit of the magnet 64, the shear force is too high for workpiece Wc to move. However, when the magnet 64 nears the edge of workpiece Wc the magnet coupling efficiency increases to a level sufficient to overcome friction, permitting the workpiece Wc to move along the static bed 36.

When the magnet 64 gets to the edge of the workpiece Wc, the magnetic flux acting on workpiece Wc wraps around the edge of the sheet metal. This gives the effect of increasing the thickness of the workpiece Wc, reducing the magnetic saturation, and improving the coupling efficiency. The magnet 64 induces magnetism in the workpiece Wc, making the edge of workpiece Wc a magnetic pole that is more strongly attracted to the opposite magnetic pole of magnet 6.

The most stable state between the induced magnetic pole in the workpiece Wc and the magnetic pole of the magnet 64 is when they are aligned. This principle can be used in the invention to flip workpieces Wc into a desired orientation. In most cases however, the force urging the edge of the workpiece Wc to align with pole of the magnet 64 (i.e. try to tip workpiece Wc up on the narrow end) will simply act to reduce the friction between the workpiece Wc and the static bed 36.

At t=2 in FIG. 7, workpiece Wc2 has been pulled along to position P2, where workpiece Wc2 came into contact with workpiece Wb2. In this case, workpiece Wb2 physically blocks the transit of workpiece Wc2. The other factor in halting motion is that at the workpiece Wc3 contacts workpiece Wb2 magnet 64 begins to also interact with workpiece Wb2 so the magnetic coupling with workpiece Wc2 is reduced. At t=2, the position of magnet 64 to workpiece Wb2 results in reduced magnetic coupling similar to the explanation of magnet 64 to workpiece Wc0 described previously.

At t=3 in FIG. 7, magnet 64 has moved to position M3 under workpiece Wa3, which is again similar to the relationship between magnet 64 and workpiece Wc0, where there is comparatively weak magnetic coupling.

At t=4 in FIG. 7, magnet 64 has moved to position M4 under workpiece Wa3, which is similar to the relationship between magnet 64 and workpiece Wc1. At t=4, workpiece Wa4 has been pulled ahead similar to workpiece Wc1.

Thus, the workpieces are pulled along when the magnet reaches an edge of the workpiece. The workpiece stops advancing when it bunches up with others. When there is free space towards the end of the conveyor, such as when automation has unloaded a workpiece, a single workpiece will advance from the bunched up workpieces. The isolated workpiece can remain segregated if progression of the magnet travel is halted before the next workpiece can be advanced.

The described sequence references the travel of one magnet. However, in practice, the magnets 64 mounted on many flight bars 60 that are spaced along the chain 52. The minimum spacing between flight bars 60 needs to be slightly longer than the effective length of the workpieces plus the width or diameter of the magnet 64. This spacing ensures each workpiece Wa, Wb, Wc will only interact with the magnet(s) on one flight bar 60 at a time. Wider spacing is not a problem as long as the conveyor 12 can maintain the required workpiece delivery rate. When there are multiple workpieces, the largest spacing between flight bars 60 will likely work for all.

Again, the effectiveness of the magnetic coupling can be adjusted by changing the air gap G, i.e., the distance between the magnet 64 and the static bed 36. The force of magnetic attraction has an inverse square relationship with the amount of air gap G. The adjustable air gap provides a method for achieving a desired magnetic attraction force with a reduced number of magnet part numbers.

Figure 8A:
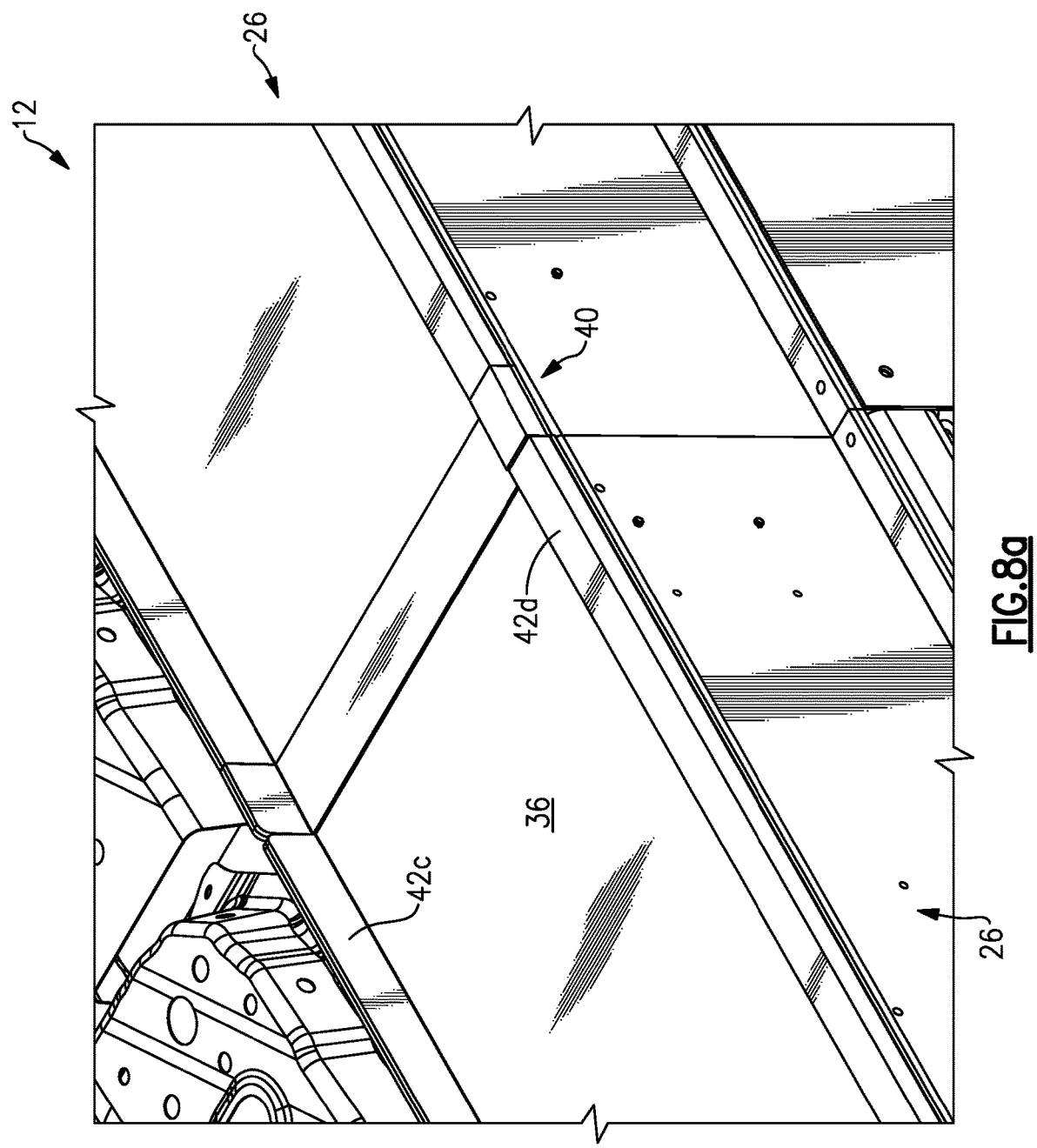
FIG. 8a is an enlarged perspective view of a transition between intermediate modules of a conveyor.

There is provision for an overlap at transitions 40 (FIG. 8a) between sections of adjacent modules 24-28 of the static bed 36. There are typically two full thicknesses of the static bed material at an overlap, which would double the distance through which the magnetic attraction has to remain effective and may influence the magnet selection. The vertical separation at the overlap end normally presents no challenge to the forward motion of the workpiece. If desired however, the surface of the top static beds can be tapered to form a ramp or both surfaces can be tapered to make a mitered butt joint. Alternatively, instead of an overlap, a break line can be formed in the static bed to bend the end of the static bed upwards, creating a ramp. Such a ramp serves to lift the workpiece before it transits across to the next module. While this ramp may be imperceptibly small to the casual observer, it ensures the workpiece will not hang-up when transiting the interface.

Referring to FIG. 8b, the transition 40 may be provided by a ramp 80. The thickness of the ramp adjacent to an upstream module 26a is less than the thickness of the static bed 36 and less than the thickness of the ramp adjacent to the downstream module 26b. In this manner, there will not be a lip between the adjacent modules 26a, 26b that might catch the workpiece W and pull it off the magnet 64 before the magnet 64 has an opportunity to drag the workpiece W to the desired position. Referring to FIG. 8c, overlapping ends 82a, 82b may be arranged such that the end 82a of the upstream module 26a is arranged higher than the end 82b of the downstream module 26b.

The static bed 36 of the conveyor 12 can be any non-magnetic material suitable for the application. One static bed configuration for feeding sheet metal stampings with sharp trim edges is an abrasive resisting nonmagnetic sheet metal, such as 316 stainless steel, with an applied ceramic coating. The thickness of the static bed 36 is closely associated with the mass of the workpiece since this influences the amount of deflection and frictional wear effects (i.e., service life). The static bed may be made of one piece or multiple pieces with joints in-line or normal to the direction of magnet travel. It is preferably as thin as possible. However, thin sheet metal is challenging to maintain consistently flat and stable (i.e., free from oil canning).

Reinforcements may be used to strengthen the static bed 36 and prevent warpage, for example, by pulling the static bed 36 taut. Alternatively, in one example shown in FIG. 8d, the reinforcement 84 may be a crease. In another example shown in FIG. 8e, the reinforcement 184 may be a stiffening member adhered to an underside of the static bed 36.

The guides 42 can be formed and secured in a variety of ways. Example guides are shown in FIGS. 9a-9b. In FIG. 9a, the guide 42 is formed integrally with the static bed 36 such that it is constructed from the same material. In the case of a static bed 36, the guide 42 may be bent. In the example of a polymer-based static bed 36, the guide 42 may be integrally molded with the static bed 36. The example guide 142 shown in FIG. 9b is discrete from the static bed 36 and secured to the frame 34 by fasteners, for example, or by welding.

The magnetic coupling provided by the disclosed conveyor avoids exposed conveyor drive elements (such as pins), which improves operator safety, minimizes the possibility of contamination, improves the ability to keep the conveyor clean. The magnets will simply stop conveying workpieces when there is something impeding transit. The loading area in the conveyor head module 24 is tolerant of a wide variation in the workpiece lateral, longitudinal and rotational position. This is useful to speed up manual loading since the window of acceptable position and orientation is large. It is also useful when the conveyor interfaces directly with other upstream processes (i.e., when there is no operator) such as when workpieces exits a forming operation by way of a chute, conveyor, or by robot manipulation. The robot only engages with the workpiece when only a portion of the workpiece is resting on the static bed of the conveyor It is possible in some configurations to use excess friction between the workpiece W and static bed 36, or a limited magnetic attraction force to reject workpieces that are improperly loaded. That is, in an incorrect orientation there can be a greater workpiece surface area engaging the static bed 36 such that the magnetic force is insufficient to move the workpiece due to the increased friction.

Consistent workpiece orientation is achieved since the magnetic coupling permits the workpiece to rotate and move laterally on the conveyor bed as the pull of the magnet is opposed by the frictional engagement between the workpiece W and static bed 36. Gravity, mechanical guides 42 and supports (e.g., the static bed 36) urge the workpieces W into an orientation suitable for the subsequent process automation. Workpieces may be accomplished without an escapement if the conveyor motion is coordinated by the controller 22 with the unloading operation. When a workpiece W is withdrawn from the unload station 37, the next part will advance without the adjacent workpiece crowding it. Crowding of the workpieces in the accumulation section is based on the workpiece interaction. Therefore, tighter accumulation of workpieces is possible than when stations have fixed or spaced tooling. The maximum accumulation density is determined by the workpieces without the need for specific setup or operating provisions.

The conveyor 12 makes ferrous metal workpieces available to production equipment. It is generally batch loaded and automatically unloaded at the production cycle rate. It provides a physical separation between the equipment operator and the process and process automation in the production equipment. It serves as accumulating buffer storage. It also removes the need for the machine operator to load workpieces at the cadence of the production equipment.

The disclosed conveyor uses magnetic attraction that isolates and orients individual workpieces from a randomly oriented grouping. Workpiece loading generally has a quite broad position tolerance in the head module 24 before the mechanical guides 42 increasing restrict the workpiece. Visual guides may be marked or projected onto the static bed 36 to establish the acceptable loading area in which the magnetic coupling force will not improperly flip or spin the workpiece into an undesirable orientation—such as entering the mechanical guides 42 backwards. The acceptable loading position and orientation variation minimizes operator engagement (e.g., attention, motor skills, and time). Most importantly, the workpiece position and orientation control is accomplished without the need for workpiece-specific tooling.

The storage density is high because the workpieces are not constrained to tooling stations or the fixed spacing of the driving means. There is no physical engagement with the workpiece so workpieces with limited or no easily accessible locating attributes can be conveyed. Furthermore, there is no physical engagement with the workpiece, which could otherwise hinder unloading automation tooling requiring the same workpiece attributes to establish the workpiece location and orientation.

The disclosed conveyor can be operated in a manner that eliminates the need to deploy a mechanical escapement to isolate a single workpiece in the unload station. Because this conveyor can separate and orient individual workpieces, an isolated workpiece, which is improperly oriented, can be identified during transit and returned to the load end. An example of an improperly oriented workpiece is one that is facing the wrong way relative to the direction of travel (i.e., backwards). The position and orientation of the workpiece may be confirmed by non-contact sensors or a vision system prior to initiating the robotic unloading sequence. If an improperly oriented workpiece is confirmed, the conveyor can be advanced to drop the workpiece off the tail module 28. If such workpieces are automatically returned to the conveyor head module (101) using, for example, a common belt conveyor, the conveyor system can be operated much like a conventional vibratory bowl feeder.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A conveyor for ferrous workpieces comprising:
    a frame;
    a static bed affixed to the frame, the static bed having a workpiece support portion constructed from a non-magnetic material, the workpiece support portion defining a workpiece flow path;
    a drive assembly arranged beneath the workpiece support portion, the drive assembly includes a continuous belt- or linkage-style conveying member supporting multiple discrete magnets configured to move in a direction of the workpiece flow path; and
    at least one guide rail extending upward with respect to the workpiece support portion on a side opposite the drive assembly, the guide rail configured to orient a workpiece to a desired position with respect to the workpiece flow path.

2. The conveyor of claim 1, wherein the conveying member includes a flight bar and at least one magnet secured by an adjustment member that provides a desired gap between the magnet and the static bed.

3. The conveyor of claim 2, wherein the conveying member includes a pair of laterally spaced apart continuous chains, flight bars mounted to the chains, and the at least one magnet secured to the flight bar by the adjustment member.

4. The conveyor of claim 2, wherein the adjustment member includes a screw and a jam nut.

5. The conveyor of claim 1, wherein the static bed includes a substrate having a coating providing a friction modifier in relation to the substrate.

6. The conveyor of claim 1, wherein the static bed includes reinforcements configured to provide a planar support surface for the workpieces.

7. The conveyor of claim 1, wherein the static bed includes multiple workpiece support portions having upstream and downstream surfaces that provide the workpiece flow path, the upstream surface raised with respect to the downstream surface.

8. The conveyor of claim 7, wherein the upstream surface overlaps the downstream surface.

9. The conveyor of claim 1, wherein the guide rail is integral with the static bed.

10. The conveyor of claim 1, wherein the guide rail is discrete from the static bed and secured relative to the frame.

11. The conveyor of claim 1, wherein the drive assembly includes a drive motor, and comprising a controller in communication with the drive motor and configured to selectively drag the workpiece to an unload position.

12. The conveyor of claim 11, wherein an escapement is mounted to the frame, and the workpiece is configured to abut the escapement in the unload position.

13. A method of conveying workpieces comprising the steps of:
    loading a first workpiece onto a static bed providing a workpiece flow path;
    loading a second workpiece onto the static bed after the loading the first workpiece;
    magnetically dragging the second workpiece along the workpiece flow path until the second workpiece contacts the first workpiece;

breaking a magnetic coupling with the second piece with a cumulative static friction created by the first and second workpieces;

magnetically dragging the first workpiece along the workpiece flow path after breaking the magnetic coupling; and orienting the first and second workpieces with a guide rail during the magnetically dragging steps.

14. The method of claim 13, wherein the static bed includes multiple workpiece support portions having upstream and downstream surfaces that provide the workpiece flow path, the upstream surface raised with respect to the downstream surface such that the first and second workpieces drops during the magnetically dragging step.

15. The method of claim 13, wherein a drive assembly includes multiple discrete magnets arranged beneath the static bed, the magnetically dragging steps includes moving the magnets in a direction of the workpiece flow path.

16. The method of claim 15, wherein the magnets are spaced from the static bed a desired gap to produce a desired magnetic coupling between the magnets and the workpiece.

17. A method of conveying workpieces comprising the steps of:

loading a workpiece onto a static bed providing a workpiece flow path;

magnetically dragging the workpiece along the workpiece flow path based upon a robot unload sequence; and orienting the workpiece with a guide rail during the magnetically dragging step.

18. The method of claim 17, comprising the steps of stopping the magnetically dragging step once the workpiece reaches an unload position, and awaiting the robot to unload the workpiece from the unload position with a drive assembly paused.

19. The method of claim 17, wherein the magnetically dragging step includes sliding a first workpiece surface along the static bed, and the workpiece orienting step includes sliding a second workpiece surface along the guide rail to position the workpiece into a desired unloading orientation.

20. The conveyor of claim 2, wherein the conveying member by a guide track beneath the magnets and configured to ensure the magnets remains consistently spaced from the workpiece during movement of the conveying member.

* * * * *